May 10, 1960 W. L. HEYNIGER 2,936,056
VARIABLE LENGTH INFLATABLE ESCAPE CHUTE
Filed Sept. 30, 1957 2 Sheets-Sheet 2
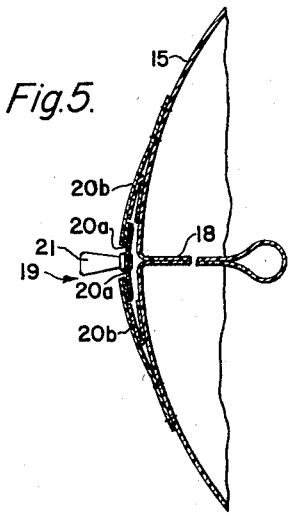
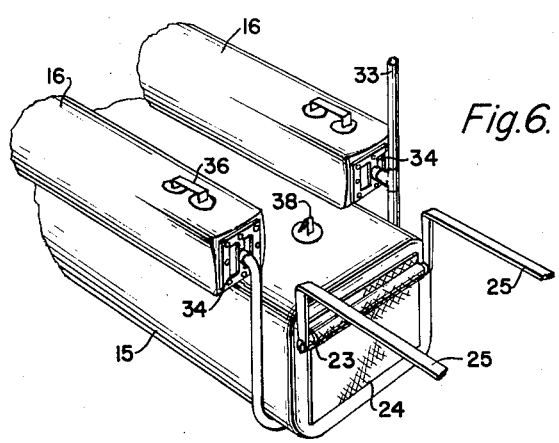
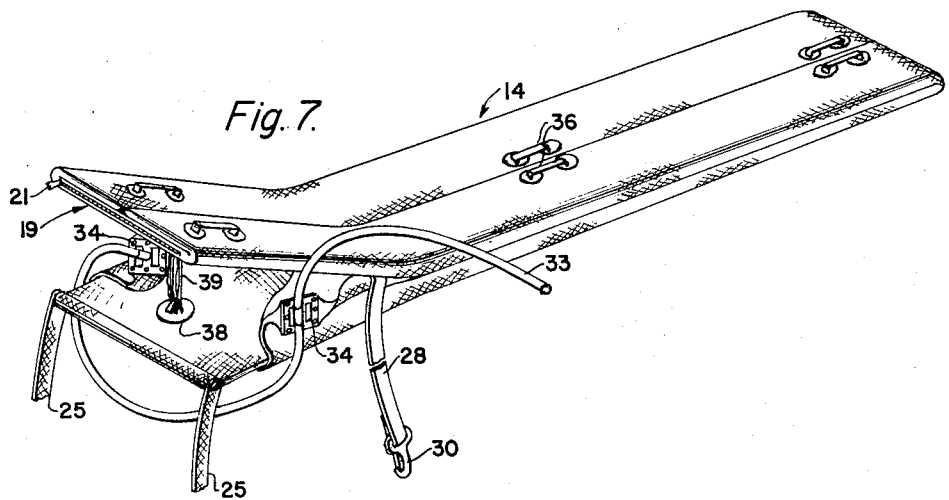
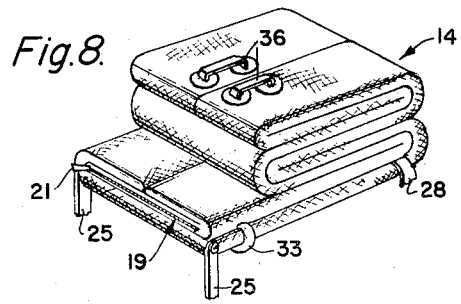
INVENTOR:
WILLIAM L. HEYNIGER,
BY J. Thomas Eubanks
Attorney.

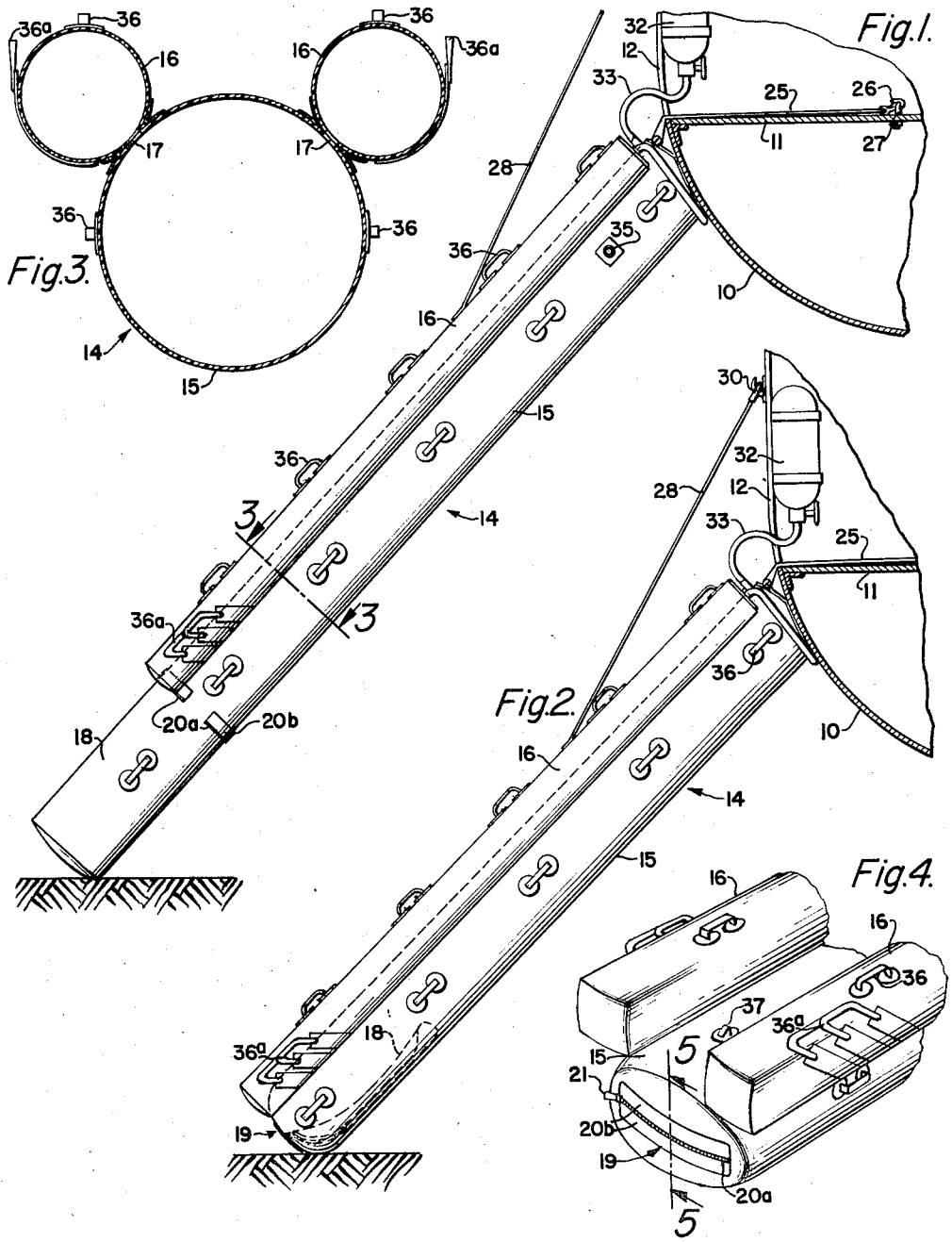

United States Patent Office 2,936,056
Patented May 10, 1960

2,936,056

VARIABLE LENGTH INFLATABLE ESCAPE CHUTE

William L. Heyniger, Sea Girt, N.J., assignor to The Garrett Corporation, Los Angeles, Calif., a corporation of California Application September 30, 1957, Serial No. 686,951

8 Claims. (Cl. 193—25)

This invention relates to an inflatable escape chute for facilitating the safe escape of persons or removal of cargo from an aircraft making a forced landing where no rigid stair, ramp or gangplank is available.

When an aircraft makes a forced landing, there is always great danger that the gas or fuel may ignite and/or explode. It is therefore desirable that means be provided to evacuate the passengers and crew in the shortest possible time. Since usually the door of the aircraft is high above the ground and no rigid stairway or ramp is available in such cases, some quick emergency escape means, such as an escape chute or slide, must be provided.

One such escape means that has heretofore been proposed for use in case of a forced landing is the inflatable escape chute shown in the Boyle U.S. Patent No. 2,765,131. This chute is adapted to be launched and manned from the aircraft and can be inflated within a very short time to form a rigid slide or ramp from the door of the aircraft to the earth's surface.

The inflatable escape chute shown in the aforementioned Boyle patent, however, can be inflated to only one fixed length, and the length of the chute is preselected so that, when the door of the aircraft is at its normally designed height above the ground, the angle or slope of the surface of the chute will provide an optimum rate of descent for persons sliding down it.

However, if for any reason, such as the collapse of one or more of the landing gear struts of the aircraft during the forced landing, or an excessive variation in the slope of the terrain, the height of the door of the aircraft above the point of contact of the chute with the earth's surface is changed, there will be a corresponding change in the angle of the surface of the inflated chute. If the change in angle is sufficiently great, the rate of descent of a person sliding down the chute will be either too fast or too slow for satisfactory egress from the plane.

It is an object of the present invention to overcome the disadvantages above referred to by providing an escape chute of the type shown in the above Boyle patent that can be inflated to a plurality of lengths thereby permitting the selection of the length that will give to the surface of the chute, when it is inflated and contacting the earth's surface at its lower end, a slope that provides an optimum rate of descent for persons sliding down it.

It is a further object of the invention to provide an escape chute of the aforementioned type having means permitting the selection of the inflated length of the chute prior to inflation.

It is a still further object of the invention to provide an escape chute of the aforementioned type that is adapted to be compactly stowed and carried in the aircraft.

Other and further objects of the present invention will become apparent from the disclosures in the following detailed specifications, appended claims, and accompanying drawings, wherein:

Fig. 1 is an elevational view of the inflatable escape chute shown in the full or extended position;

Fig. 2 is an elevational view of the inflatable escape chute shown in the restricted position;

Fig. 3 is a cross-section of the inflatable escape chute shown in Fig. 1, taken along line 3—3 thereof;

Fig. 4 is an enlarged perspective view of the ground end of the inflatable escape chute with the chute inflated in the restricted position;

Fig. 5 is a cross-section of the inflatable escape chute shown in Fig. 4, taken along line 5—5 thereof;

Fig. 6 is an enlarged perspective view of the upper end of the inflated escape chute;

Fig. 7 is a perspective view of the inflatable escape chute with the chute shown deflated and partially folded for storage in a container; and Fig. 8 is a perspective view of the inflatable escape chute with the chute shown deflated and completely folded for insertion in a container.

Referring to the drawings, there is shown an airplane, or other aircraft, having a body 10, a floor 11, and a door opening 12.

An inflatable escape chute, shown generally at 14, attached to the aircraft by means hereinafter described in detail and comprising an elongated, flexible-walled, inflatable fabric middle member 15 and a pair of elongated, flexible-walled, inflatable fabric rail members 16, is shown in Fig. 1 in the fully extended position. The rail members 16 are longitudinally secured to the middle member 15 and communicate with its interior through holes 17. As shown in Fig. 3, the three members form a trough shaped structure wherein the surface of the middle member between the rail members presents a slide-away surface. However, if a slide surface having better sliding characteristics than the fabric of the middle member is desired, a material having such characteristics may be placed on, or be bonded to, the upper surface of the middle member between the rail members. When inflated, each of three members has high resistance to bending and the trough shaped escape chute, either in the restricted or the extended position, has sufficient strength against bending to support the weight of a load or an escaping person sliding thereon.

At the upper end of the escape chute, the end of the middle member 15 and the ends of the rail members 16 are closed by fixedly located integral end walls. The rail members 16, in the embodiment shown in the drawing, can be inflated to only one fixed length and are closed at their lower ends by fixedly located end walls. The middle member 15, however, is adapted to be inflated to any one of a plurality of lengths and accordingly is provided with a portion 18 which may be extended, as shown in Fig. 1, when the chute is inflated to the full or extended length or, as shown in Fig. 2, may be turned back inside the middle member and held therein by a quick release or clamping mechanism, hereinafter described in detail, when it is desired to inflate the chute to the short length.

The portion 18 is an extension of, and may have substantially the same cross-section as, the middle member 15. A quick release gripping or clamping mechanism, such as a zipper 19, comprising the opposite halves 20a of a zipper fastener secured on the edges of a tab or false end 20b secured to the middle member 15, as shown in Fig. 5, is provided for retaining the portion 18 within the member 15 when the chute is inflated to the short length.

In practice, the portion 18 is tucked or inserted into the member 15 when the chute is deflated, and the zipper is then closed with a removable or quick release slider 21. The zipper slider is positioned near the edge of the stressed or loaded area. With the slider in place, the closed zipper will take the load and the slider will clamp the stressed end and prevent its opening. If it is desirable to use the chute in the full or extended length, it is only necessary to remove or release the slider prior to inflation. In such an instance, the closed zipper will no longer transmit a load across its closed ends and the inflation pressure will eject the tucked-in portion 18 so that the chute will inflate to its full or extended length.

In the form of the invention described above, the middle member 15 is shown as having an extendable-retractable portion, such as the similarly shaped portion 18. It is to be understood, however, that many changes may be made in the size and shape of the portion 18 without departing from the spirit of the invention. For example, one or both of the side rails can, if desired, be provided on the extendable-retractable portion 18 in a manner similar to that shown for the main tube.

At the upper end of the chute an attachment bar 23 is retained in place by a fabric sheet 24 secured to the end wall of the middle member 15, as shown in Fig. 6. A pair of ties 25 attached at opposite ends of the bar 23 are provided with snap hooks 26 at their upper ends for engaging eye bolts 27 or other quick attachable means secured to a portion of the plane, such as the floor. A pair of bracing lines, such as the lines 28 shown in Figs. 1 and 2, are secured at their lower ends to the respective rail members where the chute's load is initially applied. At their upper ends, the lines 28 are provided with a hook 30 or other means for engagement with a suitable fastener located on the respective sides of the door opening 12.

A compressed air cylinder 32 which may be secured by brackets to the wall 10 of the aircraft at one side of the door opening 12, is connected by a flexible air hose 33 to aspirator type jet pumps 34 which are mounted on the upper end wall of the rail members 16 and are adapted to eject a jet of air from the cylinder 32, and atmospheric air entrained by the jet into the members 16 to inflate them. Air then passes from the members 16 through the holes 17 into the middle members 15.

The construction and operation of aspirator type inflators suitable for this use are known in the art, an example being shown and described in the Crawford et al. U.S. Patent No. 2,772,829.

Sufficient air and/or gas must be provided to inflate the chute to full volume in the extended position. If the shorter length is to be used, the excess gas and/or air pressure must be relieved. A relief valve 35 is therefore provided at any convenient location on the chute to dump the excess gas and to prevent bursting of the structure.

In case the aircraft is in danger of sinking, the chute can be cast adrift from the airplane by releasing the hooks 26 and 30 and disconnecting or severing the inflatable air hose 33. The middle member 15 and the rail members 16 are provided with fabric hand loops 36 and 36a for manipulating the chute and also to provide something for the survivors to hold on to in case the chute must be used as a float.

For holding the escape chute in stowed condition, the chute is first folded with the rail members 16 lying partially on top and partially under the middle member 15. The chute is then folded back on itself as shown in Fig. 7 so that the sliding surfaces of the middle member abut and the ground end of the middle member 15 is adjacent the upper end of the member. A tie patch 37 located adjacent the ground end of the member 15 and a tie patch 38 located adjacent the upper end of the member 15 are joined by a breakable cord 39. Starting from the bottom end, the chute is then folded and flanked into a package having a substantially rectangular shape so that the last folded end is just short of the jet pump 34 and the zipper 19 is readily accessible as shown in Fig. 8. The chute is then placed in the container (not shown), with the ties and the flexible hose extending out of the corners of the container.

While the chute is described and shown as being folded into a substantially rectangular shape capable of being inserted into a container, it is to be understood that the chute, after being folded as shown in Fig. 7, may be rolled, begining at the fold and rolling toward the ends, into a cylindrical form equally capable of being inserted into a container. In this shape, the zipper 19 would be as accessible as in the shape shown in Fig. 8 and the straps and hose would project from the package in the same manner as shown in Fig. 8.

In operation, the flexible air hose 33 is connected with the air cylinder 32, and the snap hooks 26 on the ties 25 are engaged with the eye bolts 27 or other attachable means. Since the flexible hose and the ties extend out of the container, the above connection and attachments may be made before the airplane takes off and while the chute is still in the container. Thus, in case of a forced landing, the door of the aircraft is opened, the line 28 is secured by the hooks 30 to the fastener or other engagement means at the door of the aircraft, and the chute is removed from the container and dropped from the aircraft. The chute will unfold or unroll and hang from the plane with the upper and lower ends secured together by the breakable cord 39 as shown in Fig. 7. By hanging less than the full extension, the chances of the chute being carried beneath the airplane by prevailing winds is minimized. If the short length of the chute is desired, the zipper 19 is retained in the closed position. The slider 21 of the zipper 19 may be removed at any time. However, if the extended or full length of the chute is desired, it is preferable to remove or release the slider 21 prior to inflation. As the air in the cylinder 32 is released and the chute is inflated, the cord 39 is broken by the distending forces. If the zipper 19 is retained in the closed position, the portion 18 will be retained within the middle member 15 and the chute will inflate to the short length shown in Fig. 2. If the slider 21 is removed or released, the inflation pressure will eject the tucked-in portion 18 so that the chute will inflate to its full or extended position shown in Fig. 1.

Although the invention is described as an inflatable escape chute for facilitating the safe escape of persons or as a chute for the removal of cargo from an aircraft, it is obvious that the chute is susceptible of being used on buildings and structures in other situations calling for an available emergency chute.

I claim:

1. An inflatable escape chute for a structure, comprising: an inflatable member presenting a slide-way surface and having sufficient strength when inflated to support the weight of a load sliding thereon; means for attaching one end of the inflatable chute to means on said structure, which latter means may be located at any one of a plurality of distances above a supporting surface; and means for selectively varying the length of the inflatable member so that, when the other end of the inflated chute rests on the supporting surface, the slide-way surface will have a slope that will provide an optimum rate of descent for the load sliding on the chute.

2. An escape slide for a structure, comprising: a plurality of flexible-walled, inflatable members forming an inflatable chute having a slide-way surface on one of said members, said inflatable chute having sufficient strength when inflated to support the weight of a load sliding thereon; means for attaching one end of the inflatable chute to means on said structure, which latter means may be located at any one of a plurality of distances above a supporting surface; and means for selectively extending or retaining in retracted position a portion of said one member having the slide-way surface so that, when the other end of the inflated chute rests on the supporting surface, the slide-way surface will have a slope that will provide an optimum rate of descent for the load sliding on the chute.

3. An escape slide for a structure, comprising: an inflatable chute having a plurality of interconnected and communicating flexible-walled, inflatable members extending lengthwise of the chute and including a member having a slide-way surface, said inflatable chute having sufficient strength when inflated to support the weight of a load sliding thereon; means for attaching one end of the inflatable chute to means on said structure, which latter means may be located at any one of a plurality of distances above a supporting surface; and means for selectively extending or retaining in a retracted position a portion of said member having the slide-way surface so that, when the other end of the inflated chute rests on the supporting surface, the slide-way surface will have a slope that will provide an optimum rate of descent for the load sliding on the chute.

4. A slide for a structure, comprising: a plurality of elongated, flexible-walled, inflatable members bonded to one another to form a chute having a slide-way surface on one of said members, said inflatable chute having sufficient strength when inflated to support the weight of a load carried on the slide-way surface; means for supporting one end of the inflatable chute at said structure at any one of a plurality of distances from a supporting surface; means for inflating the chute; and means for selectively varying the length of said slide-way surface, said varying means including a portion of the said one of said members which can be turned back into the remainder of the said one of said members and a fastener, secured on the inflatable chute and releasable at will, for retaining the turned back portion within the said one of said members when the structure is inflated.

5. A slide for a structure, comprising: a plurality of interconnected and communicating elongated, flexible-walled, inflatable members forming an inflatable chute having a slide-way surface on one of said members, said inflatable chute having sufficient strength when inflated to support the weight of a load carried on the slide-way surface; means for supporting one end of the inflatable chute at said structure at any one of a plurality of distances from a supporting surface; means for inflating the chute; and means for selectively varying the length of said slide-way surface, said varying means including a portion of the said one of said members which can be turned back into the bottom part of the said one of said members and a fastener, secured on the said one of said members and releasable at will, for retaining the turned back portion within the said one of said members when the structure is inflated.

6. A slide for a structure, comprising: a plurality of elongated, flexible-walled, inflatable members bonded to one another and forming a trough shaped chute having a central member presenting a slide-way surface, said chute having sufficient strength when inflated to support the weight of a load carried on said slide-way surface; means for supporting one end of the chute at said structure at any one of a plurality of distances from a supporting surface; means for inflating said plurality of inflatable members; and means for selectively varying the length of said central member, said varying means including a portion of the said central member which can be turned back into the bottom part of the member and a fastener, secured on the said central member and releasable at will, for retaining the turned back portion within the central member when the structure is inflated.

7. A slide for a structure, comprising: a plurality of interconnected and communicating elongated, flexible-walled, inflatable members including a pair of rail members and a middle member forming a trough shaped chute having a slide-way surface on said middle member, said chute having sufficient strength when inflated to support the weight of a load carried on said slide-way surface; means for supporting one end of the chute at said structure at any one of a plurality of distances from a supporting surface; means for inflating said chute; and means for selectively varying the length of said middle member, said varying means including a portion of said middle member which can be turned back into the bottom part of the middle member and a fastener, secured on said middle member and releasable at will, for retaining the turned back portion within the middle member when the structure is inflated.

8. A slide for a structure, comprising: an inflatable member presenting a slide-way surface and having sufficient strength when inflated to support the weight of a load carried thereon; means for supporting one end of the slide at said structure at any one of a plurality of distances from a supporting surface; and means for selectively varying the length of said slide-way surface, said varying means including a portion of said inflatable member which can be turned back into the remainder of the member; and fastener means on the inflatable member for releasably retaining the turned back portion within said member when the slide is inflated.

References Cited in the file of this patent

UNITED STATES PATENTS 2,765,131     Boyle _____ Oct. 2, 1956